March 24, 1964 R. A. JEWELL ETAL 3,126,209
MEANS FOR ADJUSTABLY INTERCONNECTING
A VEHICLE RUNNING GEAR AND BODY
Filed May 7, 1962 10 Sheets-Sheet 1

INVENTORS
Robert A. Jewell
Charles B. Lemacks, Jr.

BY Mason, Fenwick & Lawrence
ATTORNEYS

March 24, 1964

R. A. JEWELL ETAL
MEANS FOR ADJUSTABLY INTERCONNECTING
A VEHICLE RUNNING GEAR AND BODY 3,126,209

Filed May 7, 1962

INVENTORS
Robert A. Jewell
Charles B. Lemacks, Jr.

BY Mason, Fenwick & Lawrence
ATTORNEYS

United States Patent Office 3,126,209
Patented Mar. 24, 1964

3,126,209
MEANS FOR ADJUSTABLY INTERCONNECTING A VEHICLE RUNNING GEAR AND BODY
Robert A. Jewell and Charles B. Lemacks, Jr., Savannah, Ga.; said Jewell assignor to Great Dane Trailers, Inc., Savannah, Ga., a corporation of Georgia
Filed May 7, 1962, Ser. No. 192,664
12 Claims. (Cl. 280—81)

This invention relates to vehicle running gear, and more particularly to means for connecting the running gear to the frame which will allow for adjustment of the running gear position relative to the frame.

It has been customary in some vehicles adapted for carrying heavy loads to make provision for mounting the rear wheels at different longitudinal positions along the frame to compensate for different load conditions. In some cases, the rear running gear could be disconnected from the frame, shifted lengthwise of the frame and reconnected. This involved considerable time and labor. It has also been proposed that means be provided for releasable connection of the gear to the frame so that the running gear could be released, the frame shifted relative to the gear and the assembly relocked in the new position. There have been other proposals whereby the device could be pre-set for a desired shift, unlocked, the frame shifted, and, when the preselected position is reached, the device is automatically relocked. It is with the last mentioned type that the present invention is concerned.

The general object of the present invention is to provide an improved means for interconnecting a vehicle running gear and frame which permits adjustment of the frame relative to the running gear and automatic locking when a preselected position has been reached.

A more specific object is the provision of means, operable from one side of the vehicle to release the running gear from the frame and to preselect a position at which relocking will take place.

Another object is to provide mechanism of this kind wherein the preselector mechanism will have but a short span of movement, but will control adjustment of the running gear over a relatively long section of the frame.

A further object of the invention is to provide an adjustment preselector mechanism which will be simple yet efficient in operation, and provide for quick and positive adjustment of the running gear relative to the frame.

Other objects of the invention will become apparent from the following description of practical embodiments thereof, when taken in conjunction with the drawings which accompany, and form part of, this invention.

In the drawings:

FIGURE 13 is a view partly in end elevation and partly in section taken on the line 13—13 of FIGURE 12;

FIGURE 18 is a horizontal section taken on the line 18—18 of FIGURE 13.

In general, the invention consists in vehicle running gear having a sliding mount on a vehicle frame with means for locking the running gear to the frame at a plurality of longitudinally spaced positions along the frame. Means are provided for releasing the running gear from the frame, preselecting one of the positions of adjustment, and automatically relocking the running gear to the frame when the preselected position has been reached.

Figure 1:
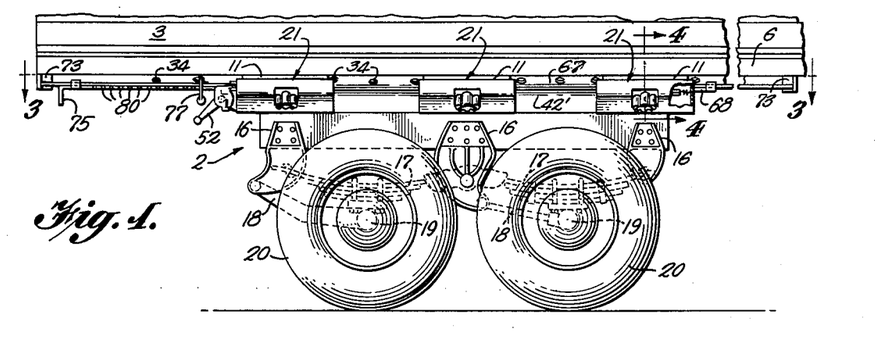
FIGURE 1 is a partial side elevation of a truck or trailer, illustrating a portion of the body and a tandem running gear, with one practical embodiment of the present invention providing the interconnection between the body and running gear.
Figure 2:
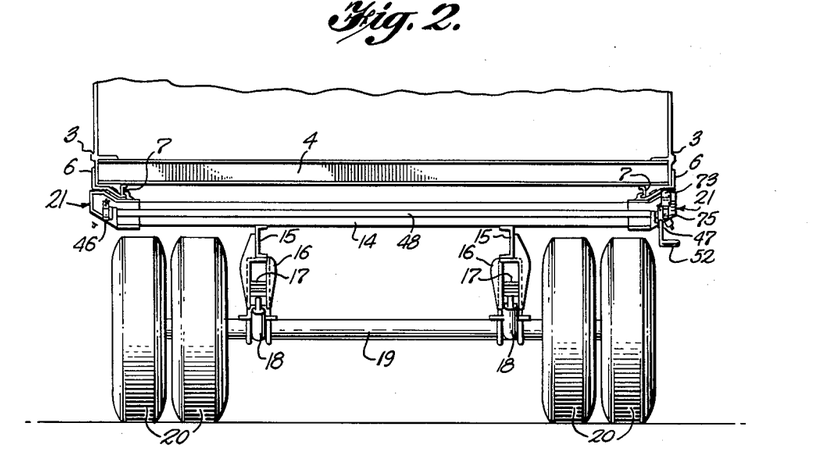
FIGURE 2 is rear elevation of the structure shown in FIGURE 1.
Figure 3:
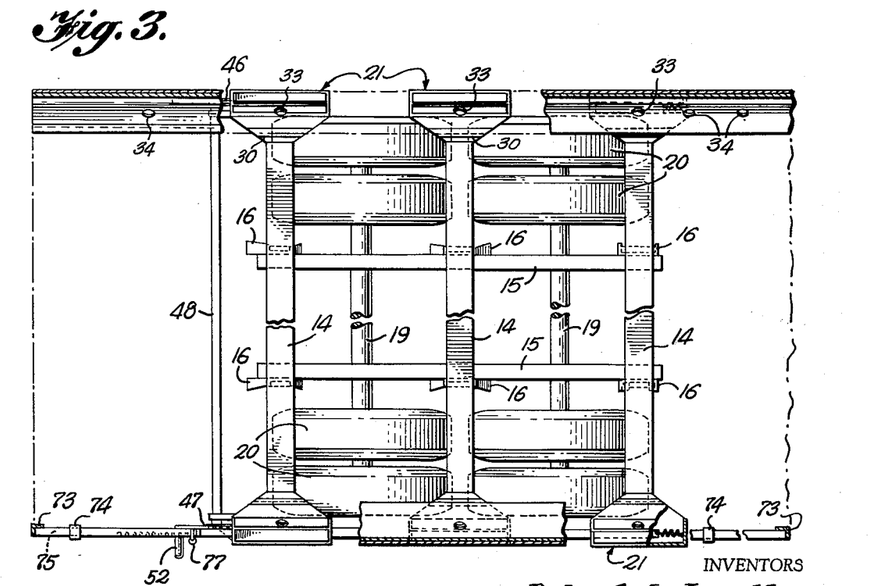
FIGURE 3 is a horizontal section take on the line 3—3 of FIGURE 1.
Figure 4:
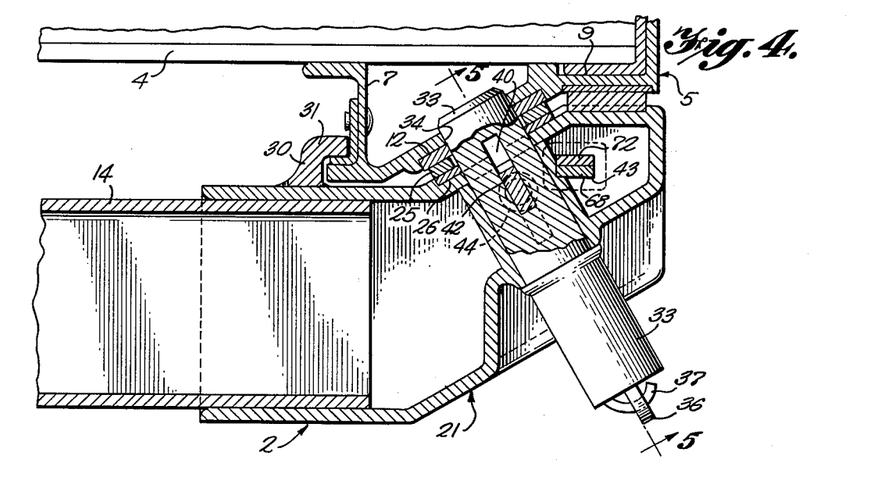
FIGURE 4 is a fragmentary vertical transverse section on the line 4—4 of FIGURE 1.
Figure 5:
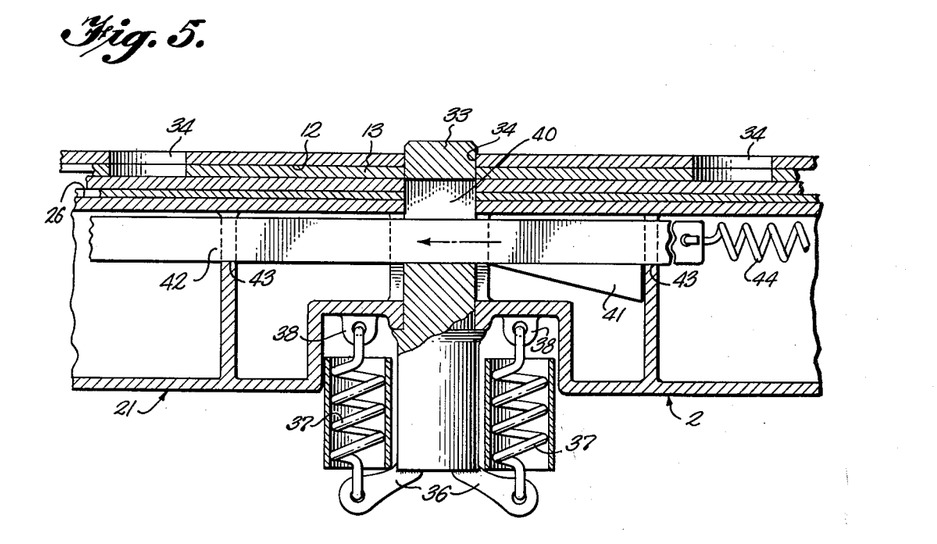
FIGURE 5 is a section on line 5—5 of FIGURE 4.
Figure 6:
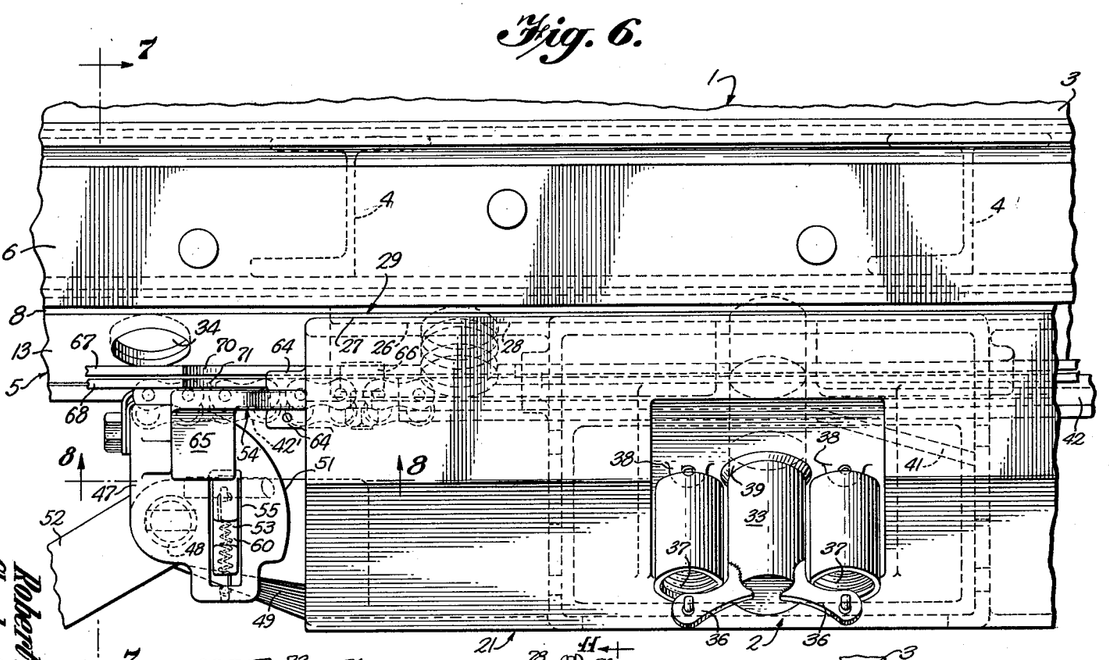
FIGURE 6 is an enlarged detail of part of the vehicle and sliding mount and the adjusting mechanism, shown in side elevation.
Figure 7:
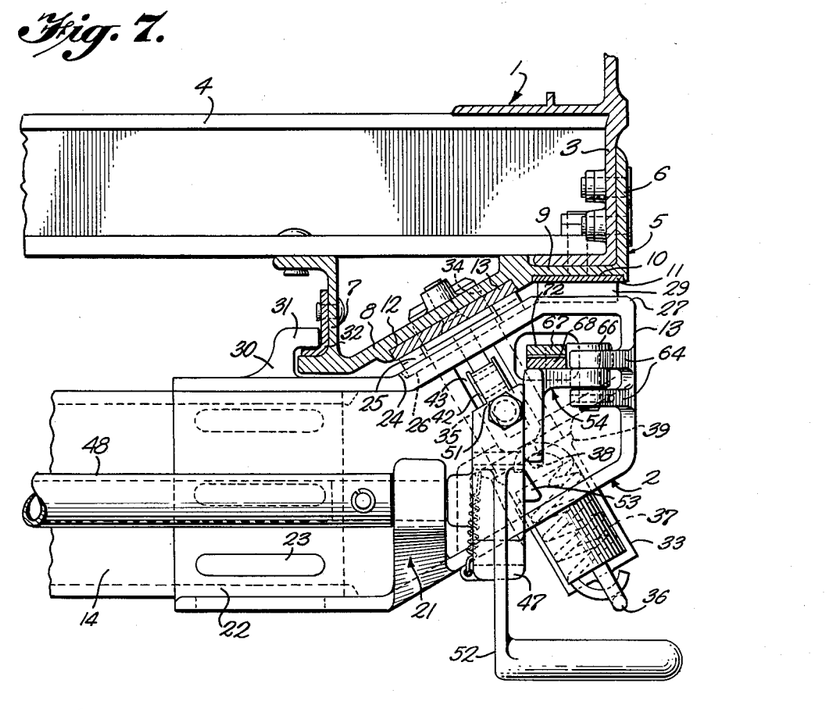
FIGURE 7 is a vertical transverse section taken on the line 7—7 of FIGURE 6.
Figure 8:
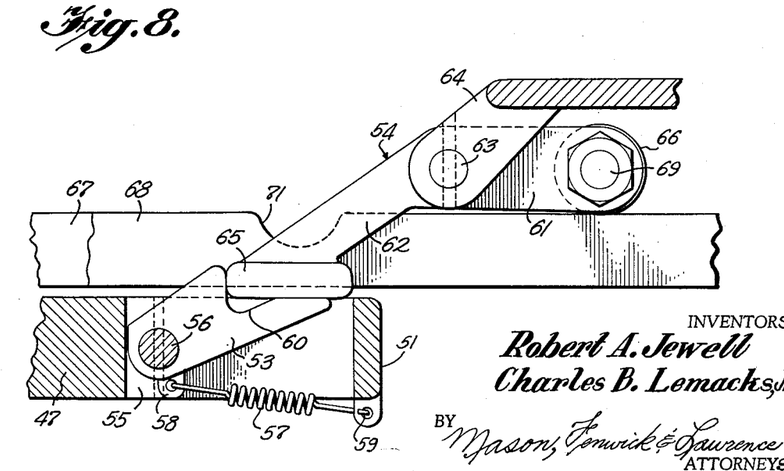
FIGURE 8 is a horizontal section taken on the line 8—8 of FIGURE 6.
Figure 9:
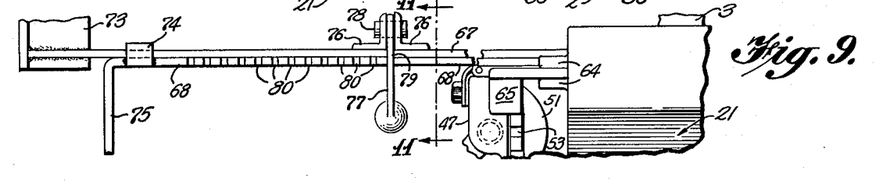
FIGURE 9 shows in side elevation the preselector mechanism at the control end.
Figures 10, 11:
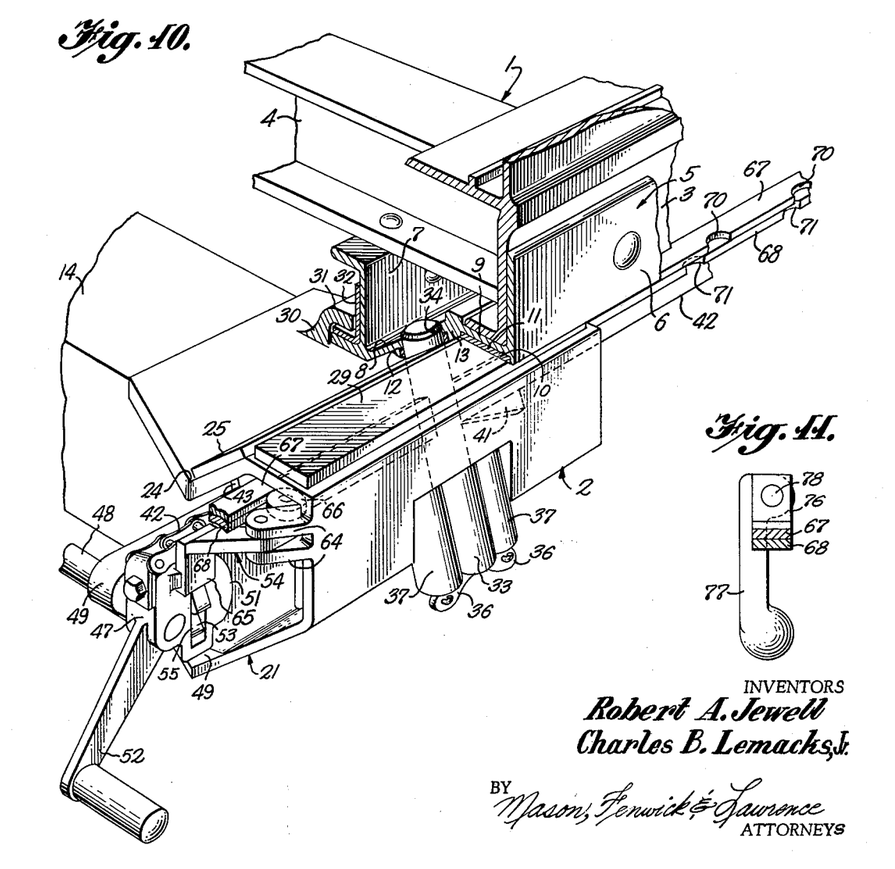
FIGURE 10 shows in perspective that part of the structure shown in FIGURE 6.
FIGURE 11 is a detail of the preselector lock and is taken on the line 11—11 of FIGURE 9.

Referring to the drawings in detail, and first to that form of the invention shown in FIGURES 1 to 11 there is illustrated a vehicle with a sliding running gear mount, wherein the running gear has an outside sliding mount. In this form of the invention, the trailer is shown at 1 and the running gear at 2. The gear is capable of sliding adjustment forwardly and rearwardly of the trailer body in accordance with load requirements. The running gear shown is the usual tandem mount.

The trailer body can take any form, and is shown as including bottom side rails, or longerons, 3, extending the length of the body. The side rails are connected by a plurality of spaced, parallel, transversely extending crossmembers 4 to form a rigid frame.

Connected to the side rails and crossmembers are slide rails 5, which are of sufficient length to extend along the side rails the full length of the adjustment area. The slide rails are extruded members, and include right angle sections 6 to fit around the bottom corners of the side rails to take the full vertical thrust between the running gear and body, channel sections 7, spaced inwardly from the right angle sections 6 and underlying, and connected to, the crossmembers 4, and inclined sections 8, interconnecting the right angle and channel sections and forming side thrust bearing members. The base arms 9 of the right angle members are grooved, as at 10, to receive a slide strip 11. The inclined, side thrust members also are grooved, as at 12, and contain slide strips 13. Rivets, or other suitable fastening means, connect the right angle sections and the channel sections to the trailer side rails and crossmembers, respectively.

The running gear frame includes a plurality of spaced, parallel, transversely extending box beams 14 interconnected by longitudinal members 15. Hangers 16, supporting the usual spring 17 and rocker arms 18 depend from the members 15. These elements carry axles 19 and wheels 20 in normal manner.

Each of the box beams 14 is capped at its ends by end castings 21. The castings have horizontal, recessed inner ends 22 which are plug welded to the beams, as at 23. Each casting has an inclined upper surface 24 parallel to, and underlying, the inclined section 8 of one of the slide rails. Slide pads 25 of "Teflon," or similar material, seat in recesses 26 in the inclined surfaces of the castings, for sliding contact with the slide strips 13. The upper surfaces of the castings terminate in horizontal portions 27 which are recessed at 28 to receive slide pads 29 for bearing contact with the slide strips 11. In order to prevent vertical separation of the running gear and vehicle body, each end casting is provided with a hooked projection 30 which has its horizontal lip 31 overlying a shelf bracket 32 bolted to the central web of the channel section 7 of the adjacent slide rail and seated upon the bottom flange of that section.

The vehicle body and running gear are held against relative movement by means of lock pins 33 which fit into openings 34 in the inclined bearing members 8 of the slide rails. The pins are slidably mounted in openings 35 which extend through the end castings 21, with their axes normal to the upper inclined surfaces 24 of the end castings. Each lock pin has laterally projecting arms 36 at its outer end, and the arms are connected to the ends of coil springs 37 which have their opposite ends anchored to eyes 38 on the end castings. The springs urged the pins toward locking position, and the pins are provided with peripheral stop flanges 39 to limit their inward movement.

Each pin has a diametral slot 40, and a wedge cam 41 is provided for movement in and out of the slot to cause axial movement of the pin, to withdraw it from locking engagement with its companion opening 34 in the slide rail and to allow the pin to seat in the opening. The wedge cams controlling the pins on opposite sides of the running gear are mounted on bars 42 for simultaneous movement. The bars on opposite sides of the vehicle extend through passages 43 formed through the respective end castings 21. The bars will have one end attached to coil springs 44, which, in turn, are connected to one of the end castings, as at 45. The opposite ends of the bars are connected to chains 42' which are connected to the peripheries of release cams 46 and 47, mounted on opposite ends of a shaft 48, extending transversely of the running gear and journalled in bearing ears 49 projecting from the end castings 21 at one end of the running gear. Release cam 46 is quadrant shaped and has an inclined peripheral face 50 parallel to the chain bottom, and about which the chain will wrap when the cam is rotated. Cam 47 has a similar, arcuate, inclined face 51 about which its chain will wrap. Cam 47 carries a handle 52, by means of which cam 47, and through shaft 48, cam 46 may be rocked to cause the chains to wrap around the cams and be drawn lengthwise, to pull the wedge cams 41 into slots 40 in the locking pins 33 to withdraw the pins from openings 34 in the slide rails. This movement of the chains will extend springs 44, and when the chains are released the contracting springs will draw back the chains and withdraw the wedge cams from the pin slots and allow the pins to reseat in openings in the slide rail.

As the vehicle body is to be moved relative to the running gear while pins 33 are disengaged, latch means are provided to hold the release cams against return movement until the latch is tripped. The latch means includes a latch arm 53 and a bell crank cam follower, or triggers, 54. Latch arm 53 is mounted in a slot 55 in cam 47 upon a pivot pin 56, and is urged toward latching position by a spring 57 connected to an eye 58, on the latch arm, and an eye 59 on cam 47 adjacent one end of slot 55. Latch arm 53 has a notch 60 to engage the bell crank when in latching position. Slot 55 and latch arm 53 occupy a position normal to the path of chain travel when the chains are in retracted position and the cams are inoperative.

Bell crank 54 extends parallel to the chain path, and has a cam follower arm 61 and a latch-engaging arm 62. A pivot pin 63 mounts the bell crank between ears 64 extending from the end castings having shaft-bearing ears 49. The latch-engaging arm carries a latch plate 65 which lies in the path of arcuate movement of the cam slot 55 and latch arm 53, when the bell crank is in latching position. Because of this, rotation of the release cam 47 will cause the latch arm 53 to be carried into contact with the latch plate, and the latch arm will be depressed, pass under the latch plate and spring up behind the latch plate to seat the latch plate in notch 60 in the latch arm. This will hold the release cam against return movement until the bell crank is rocked to move the latch plate from the latch arm notch. When the release cam is in this position, the chains are drawn forward and wedge cams 41 will have moved the lock pins 33 to withdrawn position.

The cam-follower arm 61 of the bell crank carries a roller 66, offset to one side of the arm to ride upon a pair of preselector bars 67 and 68. The roller is mounted upon a pivot shaft 69 fixed to the cam-follower arm 61. The preselector bars have notches 70 and 71 in their side edges confronting the roller 66, and when two of these notches are aligned, the roller 66 may drop into them, moving the latch plate 65 out of the notch in the latch arm to free the release cam for return movement and the locking pins for re-locking movement.

The preselector bars are mounted side-by side in passages 72 in the end casting 21. Bar 67 is fastened at its ends to brackets 73 which are fixed to two of the cross-markers 4 of the vehicle body, so that the bar is held stationary relative to the body. Straps 74 have their ends attached to bar 68 and encircle bar 67 to permit bar 68 to slide along bar 67. One end of bar 68 is bent outwardly to form a handle 75 by means of which bar 68 may be shifted lengthwise relative to bar 67. Bar 67 carries on its back a pair of ears 76 between which a locking lever 77 is mounted on a pin 78. Locking lever 77, when lowered about its pivot pin 78 seats in a locking notch 79 in bar 67 and a selected one of a plurality of locking notches 80 in the movable bar 68. When bar 68 is to be shifted, locking lever 77 is swung upwardly, clear of locking notches 79 and 80, and the bar moved longitudinally to bring a desired locking notch 80 into alignment with the locking notch 79. The lever is then lowered to seat in the aligned locking notches and hold the bars against relative movement.

The cam notches 70 in the fixed bar 67 are spaced along the bar at equal distances in accordance with the desired steps of adjustment of the running gear relative to the body. There can be any fixed spacing, for example six inches, and if thirteen recesses are used it will provide three feet of overall adjustment in six inch increments. The movable bar 68 will have an equal number of notches 71, but the spacing between them will be slightly greater. By having the spacing between notches 71 six and one-half inches (if the notches 70 are spaced six inches) there will be only one notch of bar 68 aligned with a notch of bar 67 at one time. The alignment of the notches can be made automatic by spacing the locking notches 80 of bar 68 a distance equal to the difference between the spacings of notches 70 and 71, or, in the example given, one-half inch. With this arrangement, whenever a locking notch 80 is aligned with locking notch 79 a cam notch 70 and a cam notch 71 will be aligned. The locking notches can be marked, if desired, to provide a visual indicator for the proper setting of the preselector bars for a desired shift of the running gear.

In using the device, the preselector locking lever will be lifted to release bar 68, and that bar will be shifted to bring a selected locking notch 80 into alignment with locking notch 79. The lever will be lowered to seat in the aligned locking notches to hold the bars in fixed relation. Two things will occur upon shifting of the bar 68; the bell-crank 54 will be rocked to latching position as its roller 66 is caused to rise as the previously aligned cam notches 70 and 71 move out of alignment, and a new pair of cam notches 70 and 71 are aligned.

The roller will now be riding on the outer faces of the bars. The release cam handle 52 will be turned to rotate the release cams 46 and 47 to a position where latch arm 53 will engage latch plate 65 of the bell-crank to hold the cams against return movement. As the release cams rotate, chains 42' will be drawn forward, pulling wedge cams 41 into slots 40 to withdraw lock pins 33 from engagement with the openings 34 in the slide rails 5. This will free the running gear from the body so that it may move along the slide rails. Either the running gear will be moved forwardly or rearwardly relative to the body, or the body will be shifted while the running gear is held stationary. In either event, bell-crank roller 66 will ride along the faces of the preselector bars 67 and 68 during this movement. When the roller reaches the aligned cam notches 70 and 71 it will drop into them under the urging of the spring 57 connected to the latch arm 53. This will raise the latch plate 65 from engagement with the latch arm and free the release cams for return movement. Springs 44 connected to bars 42 will retract the chains and return the release cams. Latch plate 65 will strike an abutment on release cam 47 to limit the return movement of the release cams. As the chains retract, wedge cams 41 will move out of the slots 40 in pins 33, allowing the pins to enter the openings 34 with which they are now aligned under the influence of springs 37. This will re-lock the running gear to the body.

It will be readily apparent that the preselector makes it possible to pre-set the mechanism so that when the running gear and body are disconnected they may be shifted relative to one another, and when a predetermined movement has taken place the running gear and body will be relocked automatically. The pre-setting is accomplished with but a very small movement of the preselecting mechanism.

Figure 12:
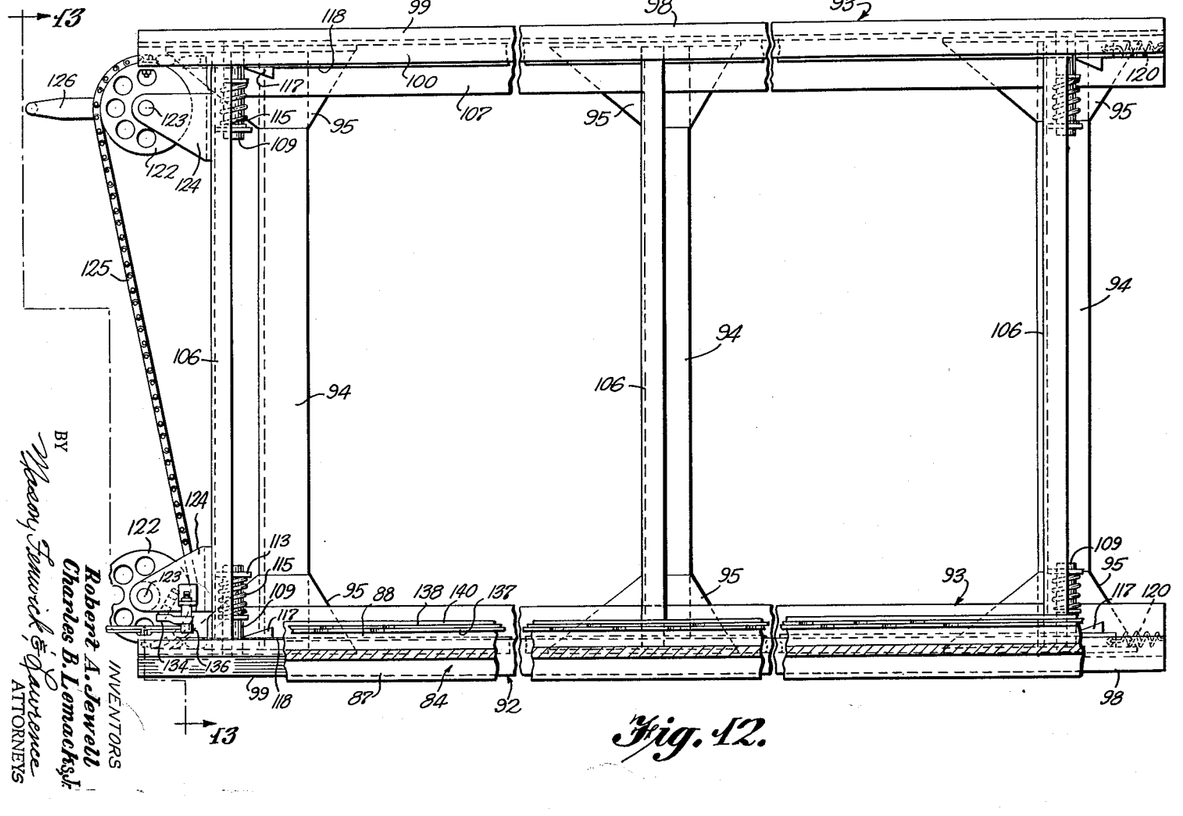
FIGURE 12 is a view in top plan of a vehicle running gear with a modified form of adjusting mechanism, a portion of the slide carried by the body of the vehicle being shown in section on one side.
Figure 14:
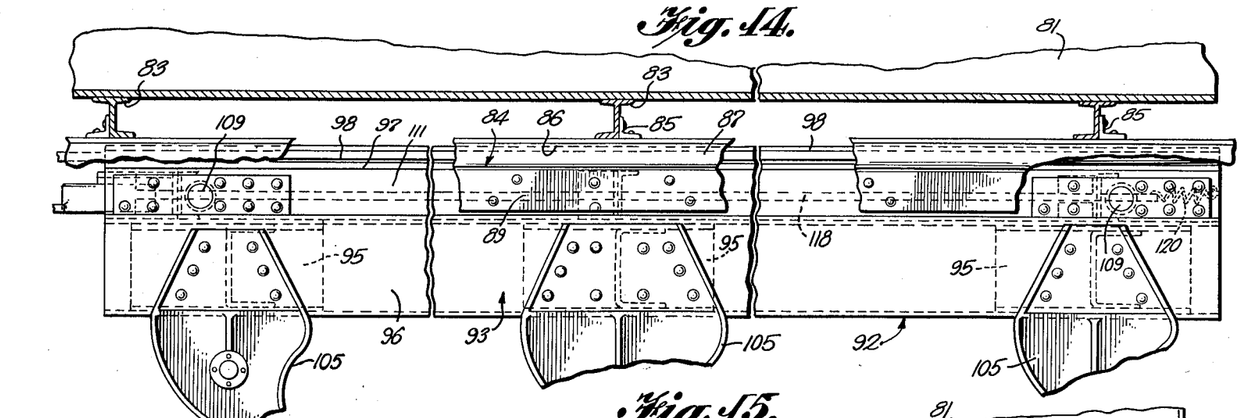
FIGURE 14 is a vertical section taken on the line 14—14 of FIGURE 13.
Figure 15:
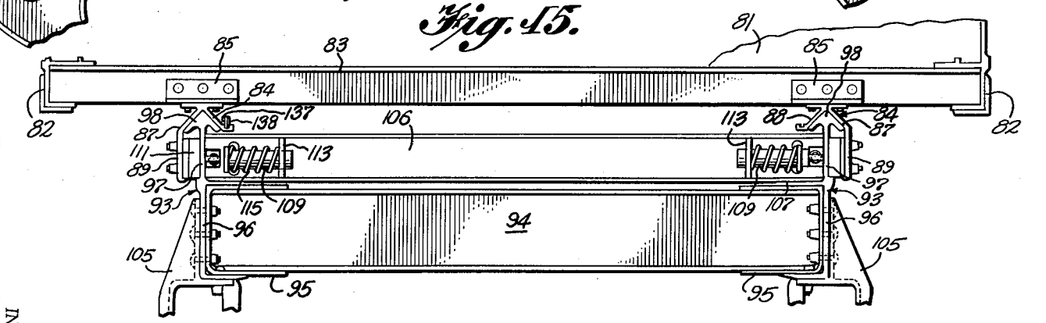
FIGURE 15 is an end view of adjacent parts of the vehicle body and running gear.
Figure 16:
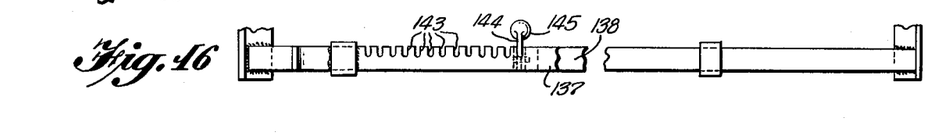
FIGURE 16 is an elevational view of the preselector bars and control means, parts being broken away.
Figure 17:
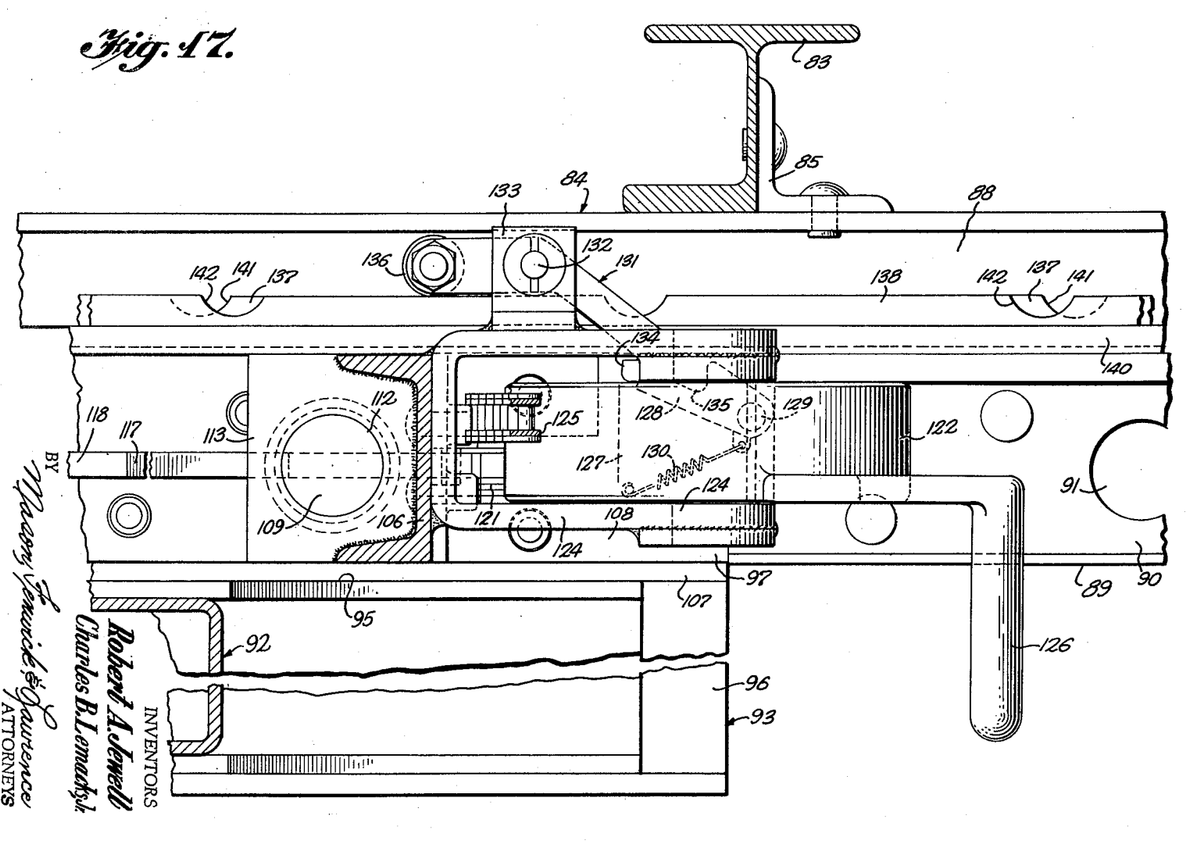
FIGURE 17 is a vertical transverse section taken on the line 17—17 of FIGURE 13.

Referring now to that form of the invention shown in FIGURES 12 to 18, what may be called an inside sliding tandem assembly is disclosed. In this form, the body 81 will have the usual bottom side rails 82 and cross-members 83, but the slide rails 84 are attached to the undersides of the cross-members by means of clip angles 85, riveted to both the cross-members and the slide rails. The slide rails have base flanges 86, with downwardly diverging slide webs 87 and 88. A vertical locking flange 89 depends from the outside slide web 87. A reinforcing strip 90 is rigidly connected to the inside face of each locking flange, and pin-receiving openings 91 are formed through the locking flanges and reinforcing strips at appropriately spaced points along their lengths.

The running gear 92 has a frame which includes a pair of transversely spaced, longitudinally extending running gear rails 93 interconnected by end and intermediate cross-channels 94. The channels are fixed to the bracing channel sections 95, which, in turn, are connected to the running gear rails 93. Rails 93 are extruded members which include a channel-shaped side frame portion 96 and an upstanding web 97 capped by a rail slide 98. The rail slides have inclined upper surfaces 99 and 100 to conform to the inclination of the slide webs 87 and 88 of slide rails 84. The rail slide surfaces 99 and 100 are recessed, as at 101 and 102, to seat slide strips 103 and 104. The sliding contact is between the strips 103 and 104 and the undersides of the slide webs 87 and 88. Hangers 105 will be attached to the frame portions 96 of the running gear rails, and the usual springs, rocker arm axles, wheels, etc. will be mounted in conventional manner.

The means for locking the running gear to the body, for releasing the lock, and for preselecting the position of the running gear relative to the body at which locking will take place is carried by channels 106 which extend transversely of the running gear frame above each of the cross-channels 94. Channels 106 have their ends in abutment with the uptsanding webs 97 of the running gear rails and seated upon the top flanges 107 of the channel-shaped frame portions 96 of the running gear rails. Channels 106 are secured to the running gear rails by angle brackets 108.

The body and running gear are locked together by lock pins 109 which are slidably mounted in openings 110 through the webs 97 of the running gear rails and strengthening pads 111 attached thereto, and openings 112 in bearing plates 113 welded to channels 106. Locking pins 109 have annular flanges 114, against which one end of coil springs 115 abut. The springs encircle the pins and have their opposite ends in abutment with bearing plates 113 to urge the pins outward into selected openings 91 in the slide rail locking flanges 89 to lock the body and running gear together. The locking pins have slots 116, similar to the arrangement in the first-described form.

Lock pins 109 are withdrawn from locking engagement with the locking flanges 89 by means of wedges 117 fixed to rods 118 which are slidable through openings 119 in channels 106. One end of each rod 118 is connected through coil spring 120 with web 97 of the adjacent running gear rail. The other ends of rods 118 are connected to short lengths of chain 121, which, in turn, are attached to the peripheries of release wheels 122. The release wheels are rotatably mounted upon shafts 123 which are fixed in bifurcated bearing brackets 124 welded to the back of the channel 106 at the front of the running gear. Wheels 122 are interconnected by a chain 125 which has its ends wrapped part way around each of the wheels. It will be seen from FIGURE 12 that the chain ends are reversely wrapped about the respective wheels so that rotation of one wheel will impart equal and opposite rotation to the other to the end that both rods 118 will be moved equally and in the same direction. At least one wheel 122 will carry a crank 126 by which the wheels and wedge rods may be operated.

As in the previously described form, movement of the rods to pin withdrawing position is resisted by springs 120 on the rods and springs 115 on the lock pins. Therefore, it is necessary to employ means to hold the wheels in pin-release position and to trip the wheels for pin-return movement. Substantially the same means are used as in the first-described form. One wheel, preferably the one on the road side of the vehicle, has a slot 127 in which a latch arm 128 is pivoted in a pin 129. The arm is biased toward latch position by a spring 130. A bellcrank 131 is pivoted upon a pin 132 in a bracket 133 carried on the bearing bracket 124. The bell-crank has a latch plate 134 for engagement with a notch 135 in the latch arm to hold the wheel against return movement. Bell crank 131 carries a roller 136 which rolls upon the tops of preselector bars 137 and 138. The bars seat in grooves 139 formed in an offset 140 of the slide web 88 of the slide rail. Bar 137 is fixed to the slide rail and bar 138 is slidable in the groove. The bars will have notches 141 and 142, similar to the notches 70 and 71 of the first form. The bars 138 will also have a series of locking notches 143 for engagement by a locking lever 144, as previously described. An operating handle 145 is carried by bar 138 so that the bar can be moved for setting.

With the inside type of assembly, the operation is almost the same as with the outside type. When the running gear position is to be changed, the preselecetor locking lever 144 is lifted, and bar 138 shifted to the desired new setting. The locking lever is then lowered to hold the bar against movement. One of the handles 126 will then be turned to rotate the wheels 122 and draw the rods 118 forward to move the wedges 117 into the slots 116 in lock pins 109 and withdraw the pins from openings 91 in the rail slide locking flanges 89. When the pins are fully withdrawn, wheel 122 will have rotated sufficiently to bring the latch arm 128 beneath the bell crank latch plate 134 so that the plate will engage the latch arm and hold the wheel against reverse rotation. The body of the vehicle may then be moved relative to the running gear. As the sliding movement takes place, bell crank roller 136 will ride on top of the preselector bars 137 and 138 until the matched notches 141 and 142 are reached, whereupon the bell crank roller will drop freeing the latch arm to allow the wheels 122 to reverse under the influence of springs 120 and 115. As the wedges 117 move out of the pin slots, springs 115 will force the pins into the properly aligned openings 91 to re-lock the body to the running gear.

While in the above practical embodiments of the invention have been disclosed, it will be understood that the specific details of construction shown are merely by way of illustration, and the invention may take other forms within the scope of the appended claims.

What is claimed is:

1. In a vehicle having a body and running gear, means mounting the running gear for adjustment longitudinally of the body to a plurality of preselected positions comprising, slide rails carried by the vehicle body and extending longitudinally of the body adjacent either side, slide members carried by the running gear upon which the slide rails are slidably supported, the body and running gear carrying companion means for locking the running gear to the body at each of the preselected positions including a retractable pin and a plurality of longitudinally spaced openings into which the pin can seat, means to retract the pin from the openings, releaseable means to hold the pin retracted including a movable trigger, preselector bars arranged in side by side relation with one bar being fixed and the other being slidable relative to the fixed bar, one bar having a plurality of recesses into which the trigger may seat to release the pin, and the other bar having means to occlude all recesses of the one bar except a selected recess to prevent seating of the trigger in any but the selected recess, the recesses in the said one bar being spaced from one another a distance equal to the spacing between the openings of the companion locking means, the preselector bars and trigger being mounted so that the trigger will move over the bars when the running gear is shifted relative to the body to drop into the selected recess to permit the pin to seat in a selected opening to lock the running gear to the body.

2. In a vehicle having a body and running gear with means for mounting the running gear for adjustment longitudinally of the body to a plurality of preselected positions as claimed in claim 1 wherein, said occluding means comprising recesses in the other bar with the recesses of one bar being spaced apart a different distance than the recesses of the other bar such that only one recess of one bar will be in registry with one recess of the other bar at any selected position of the slidable bar relative to the fixed bar.

3. In a vehicle having a body and running gear with means for mounting the running gear for adjustment longitudinally of the body to a plurality of preselected positions as claimed in claim 2 wherein, one of said bars has a positioning notch and the other bar has a plurality of selector notches spaced apart a distance equal to the difference between the spacing of the recesses of one bar and the spacing of the recesses of the other bar, and means for locking the bars against relative movement with a chosen selector notch in registry with the positioning notch.

4. In a vehicle having a body and running gear, means mounting the running gear for adjustment longitudinally of the body to a plurality of preselected positions comprising, slide rails carried by the vehicle body and extending longitudinally of the body adjacent either side, slide members carried by the running gear upon which the slide rails are slidably mounted, the slide rails having a plurality of openings therein spaced apart longitudinally along the rails, pins carried by the slide members for locking insertion in selected openings in the slide rails to lock the running gear to the body at selected positions of adjustment, means carried by the running gear for withdrawing the pins from the openings, means including a trigger to releasably hold the pins withdrawn, preselector bars arranged in side by side relation with one bar being fixedly connected to the body and the other bar slidable relative to the fixed bar, one bar having a plurality of recesses into which the trigger may seat to release the pins, and the other bar having means to occlude all the recesses of the one bar except a selected recess to prevent seating of the trigger in any but the selected recess, the recesses of said one bar being spaced apart a distance equal to the spacing between the openings in the slide rails, the preselector bars and trigger being mounted so that the trigger will move over the bars when the running gear is shifted relative to the body to drop into the selected recess to permit the pins to seat in a selected opening to lock the running gear to the body.

5. In a vehicle having a body and running gear with means for mounting the running gear for adjustment longitudinally of the body to a plurality of preselected positions as claimed in claim 4 wherein said occluding means comprising recesses in the other bar with the recesses of one bar being spaced apart a different distance than the recesses of the other bar such that only one recess of one bar will be in registry with one recess of the other bar at any selected position of the slidable bar relative to the fixed bar.

6. In a vehicle having a body and running gear with means for mounting the running gear for adjustment longitudinally of the body to a plurality of preselected positions as claimed in claim 5 wherein, one of said bars has a positioning notch and the other bar has a plurality of selector notches spaced apart a distance equal to the difference between the spacing of the recesses of one bar and the spacing of the recesses of the other bar, and means for locking the bars against relative movement with a chosen selector notch in registry with the positioning notch.

7. In a vehicle having a body and running gear with means for mounting the running gear for adjustment longitudinally of the body to a plurality of preselected positions as claimed in claim 4 wherein, the pins are biased toward seating position in the openings of the slide rails.

8. In a vehicle having a body and running gear with means for mounting the running gear for adjustment longitudinally of the body to a plurality of preselected positions as claimed in claim 4 wherein, the pins are slotted, and the means for withdrawing the pins include retractor members slidable through the slots in the pins and having wedges to camingly engage the slot ends, rotatable release cams, and flexible means connected to the retractor members and the peripheries of the release cams, whereby rotation of the release cams in one direction will draw the retractor members and wedges into the pin slots to withdraw the pin from the slide rail openings.

9. In a vehicle having a body and running gear with means for mounting the running gear for adjustment longitudinally of the body to a plurality of preselected positions as claimed in claim 8 wherein the pins are biased toward locking position and the retractor members are biased toward inoperative position.

10. In a vehicle having a body and running gear with means for adjustment longitudinally of the body to a plurality of preselected positions as claimed in claim 9 wherein, the trigger is arranged for latching engagement with the release cam when the release cam is rotated to move the retractor member to withdraw the pins.

11. A preselector mechanism comprising, a fixed bar having a plurality of recesses in one edge spaced apart a predetermined distance, a movable bar arranged beside the fixed bar for sliding movement longitudinally of the fixed bar and having an equal plurality of recesses in one edge of the companion of the recessed edge of the fixed bar, the recesses of the movable bar being spaced apart a distance differing from the spacing of the recesses in the fixed bar by an amount equal to that fractional part of the spacing distance of the fixed bar obtained by dividing the spacing distance of the fixed bar by the number of recesses in the fixed bar minus one, means to bring selected ones of the recesses of the fixed and movable bars into registry and to lock the bars against relative movement including, one of the bars having a positioning notch therein and the other of the bars having a plurality of selector notches therein equal in number to the recesses in that bar and spaced apart a distance equal to the difference between the spacing of the recesses of the fixed bar and the spacing of the recesses of the movable bar.

12. A preselector mechanism as claimed in claim 11 wherein, the means to lock the bars against relative movement comprises a locking bar movable into the positioning notch and the selector notch in registry with the positioning notch.

References Cited in the file of this patent
UNITED STATES PATENTS

| | | |
|---|---|---|
| 864,329 | North | Aug. 27, 1907 |
| 2,006,674 | Diver | July 2, 1935 |
| 2,277,947 | Bailey | Mar. 31, 1942 |
| 2,357,551 | Schlage | Sept. 5, 1944 |
| 2,841,411 | Sheppard et al. | July 1, 1958 |
| 2,935,332 | De Lay | May 3, 1960 |